US011379470B2

(12) United States Patent
Ricketts et al.

(10) Patent No.: US 11,379,470 B2
(45) Date of Patent: Jul. 5, 2022

(54) TECHNIQUES FOR CONCURRENT DATA VALUE COMMITS

(71) Applicant: Oracle International Corporation, Redwood Shores, CA (US)

(72) Inventors: Daniel Ricketts, Seattle, WA (US); Mahendra Pratap Singh Dangi, Seattle, WA (US); Calvin Alexander Loncaric, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/927,291

(22) Filed: Jul. 13, 2020

(65) Prior Publication Data

US 2022/0012232 A1   Jan. 13, 2022

(51) Int. Cl.
   G06F 7/00        (2006.01)
   G06F 17/00       (2019.01)
   G06F 16/23       (2019.01)
(52) U.S. Cl.
   CPC ...... *G06F 16/2379* (2019.01); *G06F 16/2365* (2019.01)
(58) Field of Classification Search
   None
   See application file for complete search history.

(56) References Cited

U.S. PATENT DOCUMENTS

| | | | |
|---|---|---|---|
| 6,529,921 B1* | 3/2003 | Berkowitz | G06F 16/273 715/201 |
| 7,797,329 B2 | 9/2010 | Lujan Moreno et al. | |
| 8,356,007 B2 | 1/2013 | Larson et al. | |
| 8,661,204 B2 | 2/2014 | Dwarkadas et al. | |
| 2004/0034640 A1* | 2/2004 | Jain | G06F 16/21 |
| 2009/0210457 A1 | 8/2009 | Abadi et al. | |
| 2012/0102006 A1* | 4/2012 | Larson | G06F 16/275 707/703 |

(Continued)

FOREIGN PATENT DOCUMENTS

| | | |
|---|---|---|
| CN | 110196760 A | 9/2019 |
| JP | 2002334007 A | 11/2002 |

OTHER PUBLICATIONS

"Parallel Commit Transactions", IBM Support, Available Online at https://www.ibm.com/support/pages/article-describes-using-cdrfeatures-configuration-parameter-setting-outoforder-cause-enterprise-replication-commit-transactions-parallel, 2018, 1 page.

(Continued)

*Primary Examiner* — Tuan A Pham
(74) *Attorney, Agent, or Firm* — Kilpatrick Townsend & Stockton LLP

(57) ABSTRACT

The present disclosure relates to a system and techniques for preventing corruption of snapshot data by limiting the visibility of committed data. To do this, the system may maintain an index that indicates the highest transaction identifier value such that no future commits will have a transaction identifier less than or equal to the indexed transaction identifier value. In embodiments, if a read is performed, only transactions having a transaction identifier less than or equal to the index value can be read. Each time that a transaction is committed, the index value is updated to the transaction identifier for the transaction having the highest transaction identifier without any intermediary transactions.

19 Claims, 9 Drawing Sheets

(56) References Cited

U.S. PATENT DOCUMENTS

| | | | |
|---|---|---|---|
| 2012/0271795 A1* | 10/2012 | Rao | G06F 16/27 |
| | | | 707/613 |
| 2015/0199415 A1* | 7/2015 | Bourbonnais | G06F 16/27 |
| | | | 707/615 |
| 2016/0110403 A1* | 4/2016 | Lomet | G06F 16/2255 |
| | | | 707/695 |
| 2017/0091102 A1* | 3/2017 | Wright | G06F 9/3834 |
| 2018/0349430 A1 | 12/2018 | Lee et al. | |
| 2019/0102418 A1* | 4/2019 | Vasudevan | G06F 16/2358 |

OTHER PUBLICATIONS

"Transaction layer", Cockroach Labs, Available Online at https://www.cockroachlabs.com/docs/stable/architecture/transaction-layer.html, 2020, 11 pages.

Chafi et al., "A Scalable, Non-blocking Approach to Transactional Memory", Proceedings of the 2007 IEEE 13th Internaiional Symposium on High Performance Computer Architecture, Feb. 2007, 12 pages.

Chen et al., "Synchronized Update over Distributed and Parallel Database", 2009 International Conference on Cyber-Enabled Distributed Computing and Knowledge Discovery, Oct. 2009, 4 pages.

Gottschlich et al., "An Efficient Software Transactional Memory Using Commit-Time Invalidation", Proceedings of the 8th annual IEEE/ACM international symposium on Code generation and optimization, Apr. 24-28, 2010, 10 pages.

* cited by examiner

TECHNIQUES FOR CONCURRENT DATA VALUE COMMITS

BACKGROUND

Cloud-based platforms have become increasingly common for end-to-end data management in database systems, such as Extract-Transform-Load (ETL) database systems. Such cloud-based platforms may offer entire suites of cloud solutions built around a customer's data. However, the distributed nature of cloud computing often means that a number of transactions are occurring concurrently across multiple devices within the cloud-based platform for any given piece of data. As data may be manipulated by a number of transactors, it may be difficult to ascertain a current data value for any particular piece of data while data is being manipulated via concurrent transactions.

Embodiments of the instant disclosure address these and other problems, individually and collectively.

BRIEF SUMMARY

Techniques are provided (e.g., a method, a system, non-transitory computer-readable medium storing code or instructions executable by one or more processors) for enabling concurrent commits while reducing stale data. Various embodiments are described herein, including methods, systems, non-transitory computer-readable storage media storing programs, code, or instructions executable by one or more processors, and the like.

One embodiment is directed to a method performed by a transactor host that includes maintaining, in relation to transactions in a commit queue, an index value associated with a current latest-completed transaction, each of the transactions in the commit queue having an identifier value, detecting that a first transaction of the transactions in the commit queue has been committed, determining whether at least one second transaction of the transactions in the commit queue is an intermediary transaction to the first transaction, upon determining that no second transaction of the transactions in the commit queue is an intermediary transaction to the first transaction, updating the index value to an identifier for a new latest-completed transaction, receiving an operation to be performed in relation to the transactions in the commit queue, and performing the operation on the transactions in the commit queue having an identifier value less than or equal to the index value.

Another embodiment is directed to a computing device comprising a processor; and a memory including instructions that, when executed with the processor, cause the computing device to maintain, in relation to transactions in a commit queue, an index value associated with a current latest-completed transaction, each of the transactions in the commit queue having an identifier value, detect that a first transaction of the transactions in the commit queue has been committed, determine whether at least one second transaction of the transactions in the commit queue is an intermediary transaction to the first transaction, upon determining that no second transaction of the transactions in the commit queue is an intermediary transaction to the first transaction, update the index value to an identifier for a new latest-completed transaction, receive an operation to be performed in relation to the transactions in the commit queue, and perform the operation on the transactions in the commit queue having an identifier value less than or equal to the index value.

Yet another embodiment is directed to a non-transitory computer readable medium storing specific computer-executable instructions that, when executed by a processor, cause a computer system to at least maintain, in relation to transactions in a commit queue, an index value associated with a current latest-completed transaction, each of the transactions in the commit queue having an identifier value, detect that a first transaction of the transactions in the commit queue has been committed, determine whether at least one second transaction of the transactions in the commit queue is an intermediary transaction to the first transaction, upon determining that no second transaction of the transactions in the commit queue is an intermediary transaction to the first transaction, update the index value to an identifier for a new latest-completed transaction, receive an operation to be performed in relation to the transactions in the commit queue, and perform the operation on the transactions in the commit queue having an identifier value less than or equal to the index value.

The foregoing, together with other features and embodiments will become more apparent upon referring to the following specification, claims, and accompanying drawings.

DETAILED DESCRIPTION

Figure 1:
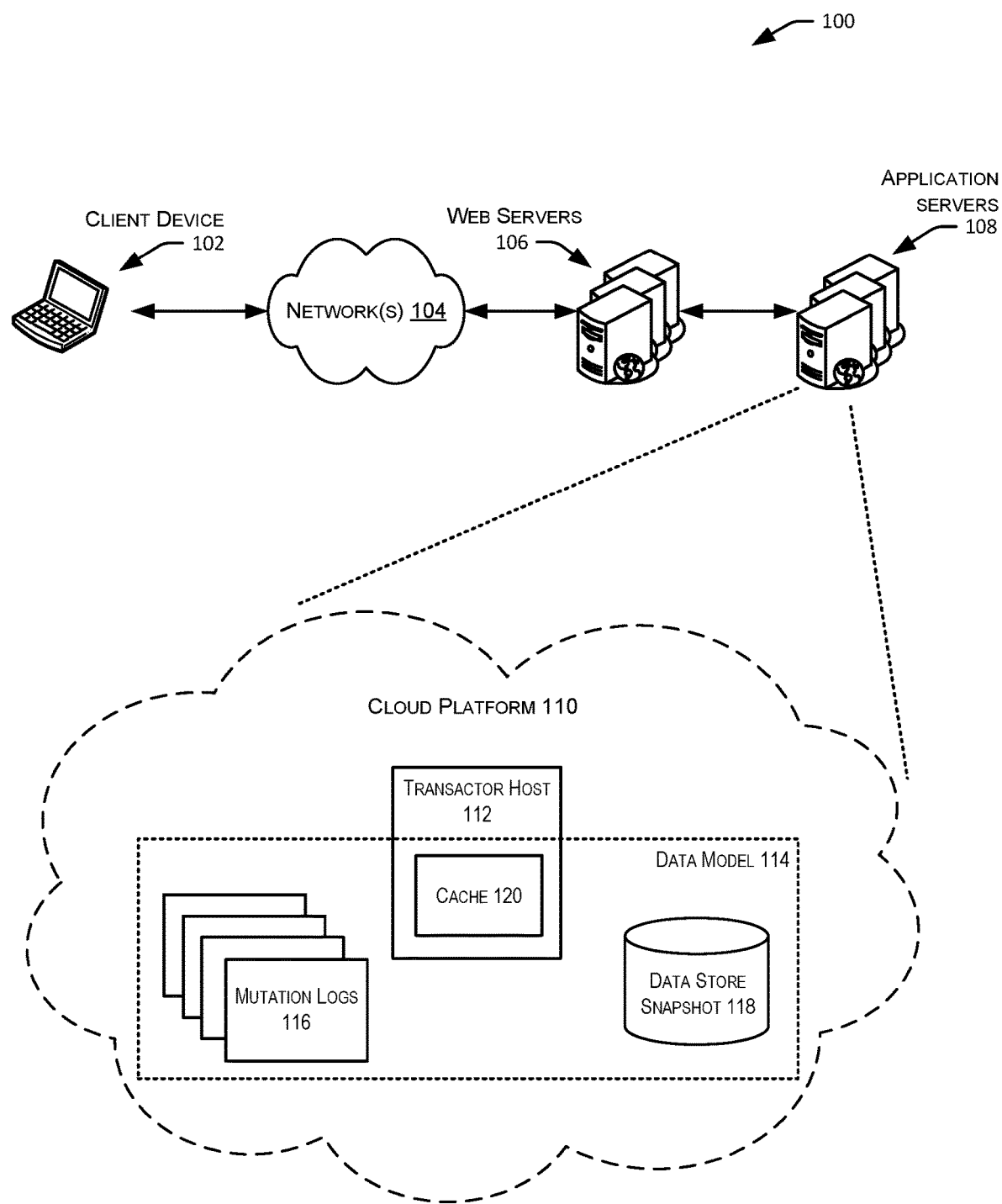
FIG. 1 depicts an illustrative system in which embodiments of the disclosure may be implemented in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and techniques for enabling concurrent commits to a data store while reducing the introduction of stale data. For the purposes of this disclosure, a "commit" to a data store refers to a permanent saving of data values after approval of a set of tentative changes.

Some existing data store management systems serialize data commits, in that commits are performed one at a time in the order in which they are received. However, this creates a potential throughput bottleneck because each commit in such a system involves at least one database round trip serially, either under a lock or using a single commit thread. Performing commits concurrently eliminates this throughput bottleneck since multiple commits can be processed simultaneously. However, performing commits concurrently in this manner may also introduce problems in which a snapshot of the data store may be generated that includes stale data. This is problematic in that the database management system needs to ensure that a snapshot does not include stale data.

By way of illustration, consider a scenario in which at the time of receiving a transaction having transaction identifier "N–2," keys X and Y both have data values of "old":

| TxnID | Key | Value |
|-------|-----|-------|
| N–2   | X   | "old" |
| N–2   | Y   | "old" |

Suppose in this scenario that two transactions commit concurrently, one with transaction identifier "N–1" that sets the value of Y to "new," and one with transaction identifier "N" that sets the value of X to "new." Since the commits for these transactions are performed concurrently, they can occur in either order. Further suppose the transaction with transaction identifier "N" is committed first even though the transaction with transaction identifier "N–1" was received first:

| TxnID | Key | Value |
|-------|-----|-------|
| N     | X   | "new" |
| N–2   | X   | "old" |
| N–2   | Y   | "old" |

If a client performs a read at this point using transaction identifier N (the maximum committed transaction identifier), then it would read (X="new," and Y="old"). Suppose that after this read, the transaction with transaction identifier "N–1" is finally committed to the data store:

| TxnID | Key | Value |
|-------|-----|-------|
| N     | X   | "new" |
| N–1   | Y   | "new" |
| N–2   | X   | "old" |
| N–2   | Y   | "old" |

If the client performs a second read, it would see (X="new," and Y="old"), which is a different result than what was returned in the previous read. This prevents the system from providing any guarantee that a transaction will read a consistent view of the data store (since past data values may change).

To address the above, embodiments may limit the visibility of committed data. To do this, the system may maintain an index that indicates the highest transaction identifier value such that no future commits will have a transaction identifier less than or equal to the indexed transaction identifier value. If a read is performed, only transactions having a transaction identifier less than or equal to the index value can be read. Each time that a transaction is committed, the index value is updated to the transaction identifier for the transaction having the highest transaction identifier without any intermediary transactions.

Embodiments described herein may provide several advantages over conventional systems. For example, embodiments may enable the system to take advantage of concurrent commit processing while preventing corruption of data that can occur as a result of such concurrent processing.

FIG. 1 depicts an illustrative system in which embodiments of the disclosure may be implemented in accordance with various embodiments. As will be appreciated, although a Web-based environment is used for purposes of explanation, different environments may be used, as appropriate, to implement various embodiments of the illustrative system. FIG. 1 depicts an illustrative system 100 that includes at least one electronic client device 102, which can include any appropriate device operable to send and receive requests, messages or information over an appropriate network 104 and convey information back to a user of the device 102. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network may be known to one skilled in the art and will not be discussed herein in detail. Communication over the network can be enabled by wired or wireless connections and combinations thereof. In this example, the network includes the Internet, as the illustrative system includes a Web server 106 for receiving requests and serving content in response thereto, although for other networks an alternative device serving a similar purpose could be used as would be apparent to one of ordinary skill in the art.

The illustrative system includes at least one application server 108. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 102 and the application server 108, can be handled by the Web servers 106. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The illustrative system includes an environment in one embodiment that is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

The application servers 108 may implement a cloud platform 110. The cloud platform 110 may implement at least one transactor host 112. In some embodiments, the cloud platform may implement a number of cloud server instances operating on behalf of one or more clients. Additionally, the cloud platform 110 may include a data model 114. In accordance with some embodiments, data model 114 may include at least the components of mutation logs 116, a data store snapshot 118, and cache memory 120.

In data model 114, mutation logs 116 may store all historical updates associated with a key identifier. Mutation logs 116 need to be persisted in durable storage and are used for replaying a data store state during bootstrapping and disaster recovery.

Additionally, in data model 114, data store snapshot 118 is made available for reading. The data store snapshot 118 stores all indexed data (without storing any historical versions) as of a given timestamp or logical sequence number (LSN). More particularly, snapshot 118, in embodiments, stores a physical materialized view of the data store on a given LSN. Data store snapshot 118 may only contain visible data as of the current LSN. With support from an index, a read from the data store snapshot 118 can be much simpler and predictable than reading from a versioned bucket (that includes historical data).

The cache memory 120 stores all recent mutations that have not yet been written to a mutation log in persistent storage and/or are not included in the data store snapshot 118. In some cases, the data store snapshot 118 may be stale with respect to data requested by a customer. To get a complete result set for a data value, a read operation can retrieve data values from the data store snapshot 118 and replay mutations stored in cache 120 since the snapshot. Based on experimental data, database resource usage may be reduced by 50% using this method.

By way of illustration, consider an example read and write operation data flow implemented using data model 114. A write operation in this example results in a mutation, which could be a transaction commit or a schema change command. Any write operations will be handled by a transactor host 112, and more particularly, a leader transactor host. Only a single transactor host 112 can be the leader transactor host at any given time in order to prevent conflicts. When completing a transaction, the leader transactor host performs conflict detection for the write operation with other in-flight or committed mutations in its cache memory before adding the write operation to a commit queue.

A read operation can be performed by any transactor host that has access to mutation logs (not just the leader transactor host). A read request, or scan request, is provided to the transactor host that stores a cache for a given key identifier. That transactor host then performs reads from both cache 120 and the data store snapshot 118, and then combines them into a final result set to return. Data in cache 120 and s data store snapshot 118 are all indexed, thus the read operation should be very fast (ideally O(log N), where N is size of rows). Read operations should not touch mutation logs in persistent storage, unless a client needs to learn about older mutations, which would be specified in the read request.

The illustrative system 100 may utilize at least one network 104 that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
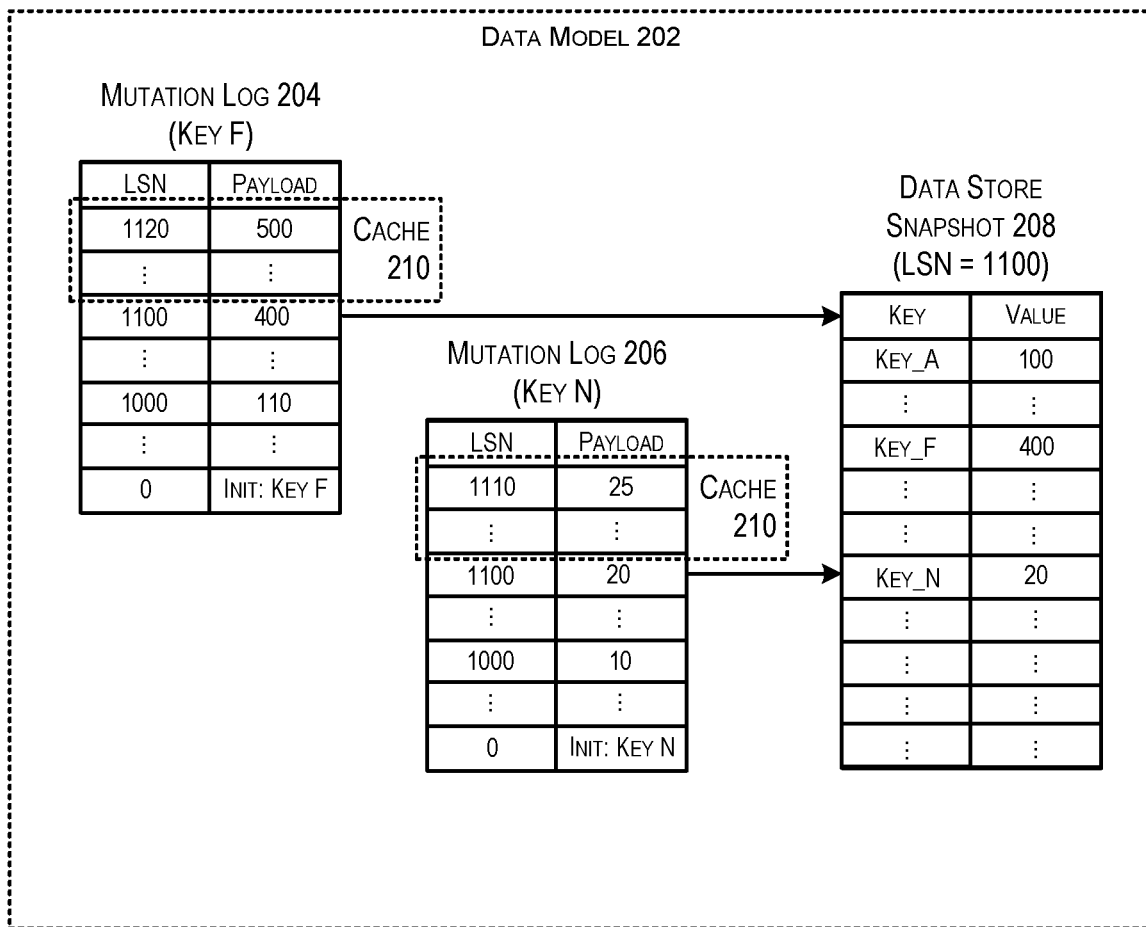
FIG. 2 depicts an example representation of mutation logs and a data store snapshot generated from mutation logs in accordance with at least some embodiments.

FIG. 2 depicts an example representation of mutation logs and a data store snapshot generated from mutation logs in accordance with at least some embodiments. In some embodiments, data model 202 may maintain data values within mutation logs (e.g., mutation log 204 and mutation log 206) and a data store snapshot 208 may be generated for a particular LSN from a collection of such mutation logs.

A mutation log, such as mutation log 204 or 206, may be any suitable searchable means for storing an indication of mutations (i.e., changes) for a particular data value or values. For example, a mutation log may be a database table. Each mutation log 204 or 206 may include at least two columns, one of which identifies an LSN at which a mutation was made and one of which includes an indication of the mutation made (e.g., a payload). However, in some embodiments, a mutation log may include more than two columns. In some embodiments, the payload may include a new data value which replaces an older data value. In some embodiments, the payload may include an indication of the mutation made (e.g., increment current data value by 1). In some embodiments, the payload column may include a command to be processed by a transactor host that reads from the mutation log. While the FIG. 2 presents an example representation in which multiple mutation logs are maintained (each for different key values) some embodiments may include a single mutation log that stores mutations for multiple key values. For example, each data store may include a single mutation log that includes mutations for that data store.

When a data value is mutated (e.g., updated) by a transactor host via a transaction, the mutations are stored in a cache memory of that transactor host. For example, mutations made to data values associated with mutation logs 204 and 206 by a transactor host may be stored in cache memory 210 of that transactor host. To commit the mutations, the cached mutations are inserted into the corresponding mutation log in a new row. In this way, a mutation log is essentially a stream of updates made to the data value, which can be replayed during disaster recovery.

In some embodiments, a data store snapshot 208 may be generated for a particular LSN (e.g., a current LSN). To generate such a data store snapshot 208 from a collection of mutation logs, the system identifies mutation log entries which correspond to the LSN and aggregates data values derived from those mutation log entries into a key-value data store. In some cases, this may involve identifying data values stored in each respective mutation log in relation to the highest LSN no greater than the snapshot LSN. In some cases, this may involve using data values from a previous data store snapshot and replaying the mutations indicated in the respective mutation log or cache 210 between the previous snapshot LSN the to-be-generated snapshot LSN. In this way, a data store snapshot 208 is generated that includes a state of the data model 202 at a particular LSN. In some embodiments, a read of a current data value for a particular key identifier may involve querying against only the latest data store snapshot 208. However, it should be noted that such a data store snapshot 208 can become stale as new mutations are generated within cache 210. To account for this, in some embodiments, a read of a current data value for a particular key identifier may involve querying against only the latest data store snapshot 208 and incorporating relevant mutations from the cache 210 which impact the key identifier.

Figure 3:
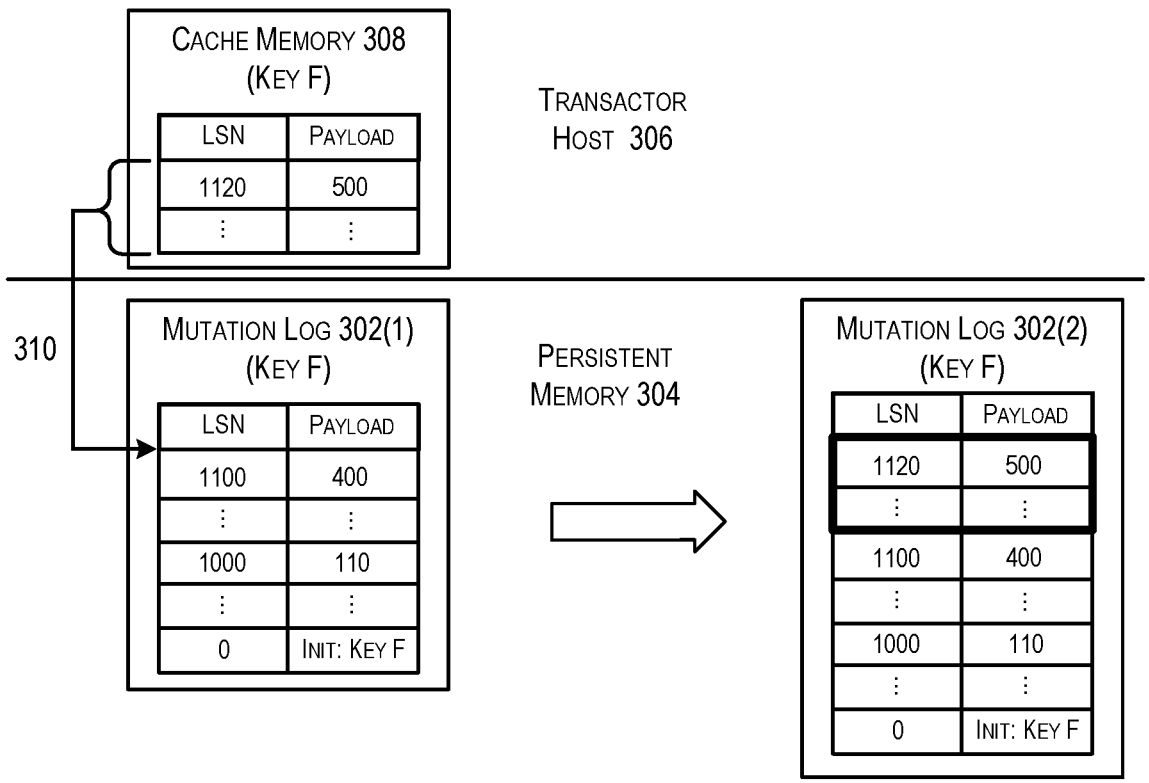
FIG. 3 depicts an example representation of a process for updating a mutation log in accordance with at least some embodiments.

FIG. 3 depicts an example representation of a process for updating a mutation log in accordance with at least some embodiments. In FIG. 3, a mutation log 302(1) for key identifier "Key F" is depicted as being stored in persistent memory 304. In some embodiments, mutation log 302 is a database table. The persistent memory 304 may be any suitable data storage means that retains data after power to that data storage means is shut off.

In some embodiments, a transactor host 306 may, when completing a transaction, generate additional mutations for the key identifier "Key F," which are written to cache memory 308. Cache memory 308 may be any suitable memory which can be accessed by the transactor host quickly, such as random access memory (RAM). In some embodiments, once all of the mutations related to a particular transaction (related to one or multiple key identifiers) have been completed, the transactor host may commit all of the mutations for that transaction in the cache memory 308 via a single commit, such that the commit is backed out if any mutations fail to be committed. During this commit, the transactor host 306 inserts one or more new rows into the mutation log 302 and writes the additional mutations from the cache memory 308 into those new rows as depicted at 310, resulting in the generation of mutation log 302(2).

Figure 4:
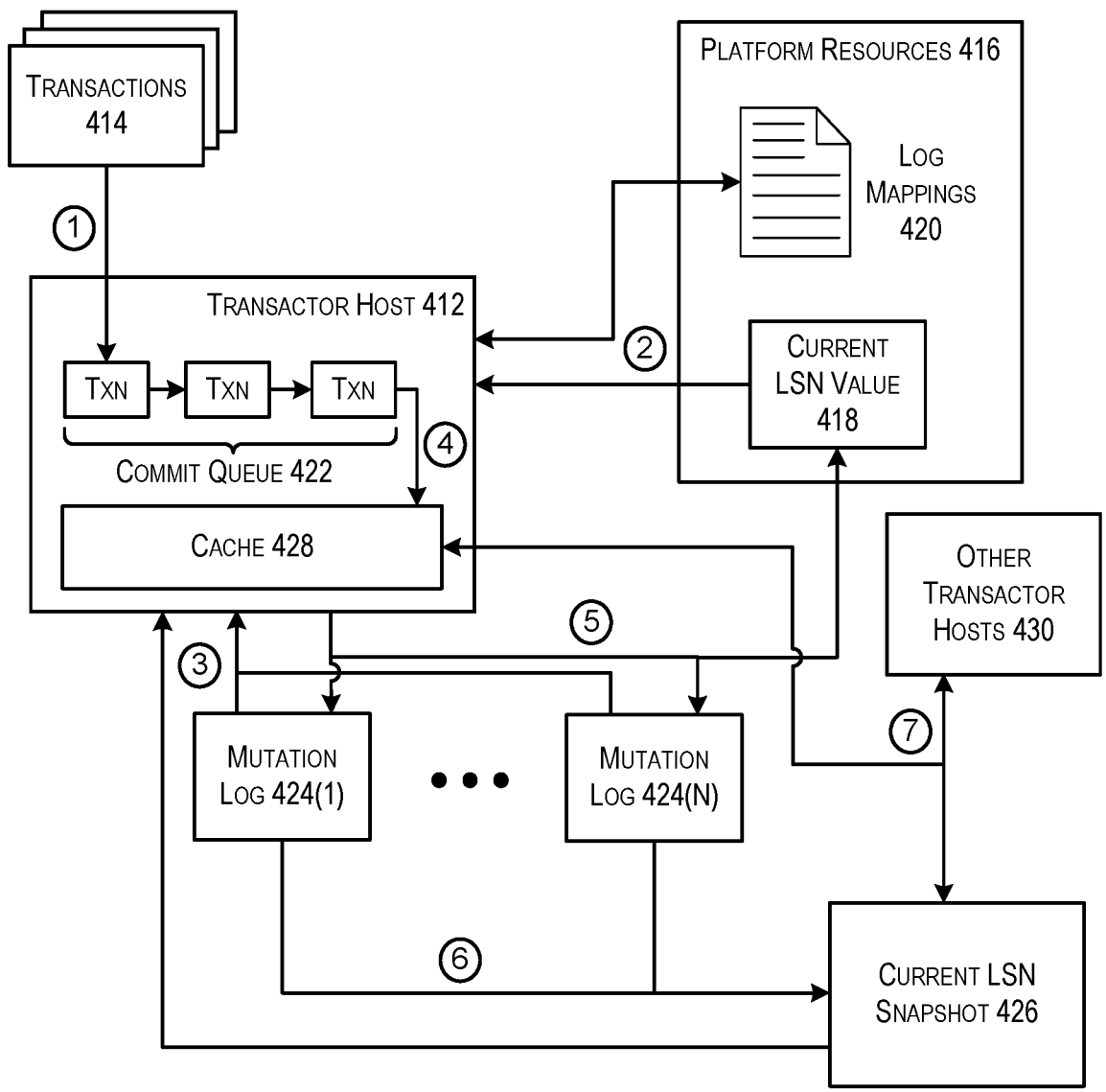
FIG. 4 depicts a diagram illustrating the performance of a transaction by a transactor host in accordance with at least some embodiments.

FIG. 4 depicts a diagram illustrating the performance of a transaction by a transactor host in accordance with at least some embodiments. More particularly, FIG. 4 depicts a process 400 by which a transactor host 412 may conduct a number of received transactions 414 to update one or more data values in a data model. The transactor host 412 may have access to platform resources 416, which may include any data commonly referenced across a platform. For example, data may be distributed, or made available, across multiple computing devices in a cloud computing platform. In some embodiments, the platform resources 416 may include a current logical sequence number (LSN) value 418 for a state of the system. In some embodiments, the platform resources may include a list of log mappings 420, which maintain a mapping of key identifiers to mutation logs.

At step 1, the transactor host 412 may receive a number of transactions 414. In some embodiments, each transaction 414 is received from a client application instantiated on a cloud platform and involves an update to one or more data values related to a client associated with the client application. Upon receiving the transaction 414, the transactor host 412 may conduct a conflict check, which involves determining whether key identifiers involved in the transaction 414 are also involved in other transactions which have not yet been committed. For example, the transactor host 412 may check each transaction within a commit queue to determine if any of those transactions impact the same key as impacted by the transaction 414. If the transaction 414 does not impact any keys that are impacted by the transactions in the commit queue 422, then the conflict check is passed and the transaction is added to the commit queue 422. Otherwise, the transaction may be rejected as a conflicting transaction. Transactions in the commit queue 422 may be handled in a first-in first out manner.

To process a transaction, the transactor host 412 may identify one or more key identifiers associated with data values to be mutated. In some embodiments, the transactor host 412 may retrieve data from platform resources at step 2. In some embodiments, the transactor host 412 may reference a mapping of key identifiers to mutation logs 420 to identify one or more mutation logs 424 associated with the transaction. Additionally, the transactor host 412 may retrieve a current LSN value 418 to be associated with the transaction and the respective mutations.

Once the transactor host 412 has identified the key identifiers for which data values are to be mutated, the transactor host 412 may retrieve a current data value for each of those key identifiers at step 3. In some embodiments, this may involve retrieving the data values from mutation logs 424 associated with each of the key identifiers. In some embodiments, this may involve obtaining current data values from a current snapshot 426 of the data store by querying the snapshot based on those key identifiers.

Once the current data values have been obtained, the transactor host 412 generates a mutation for the key identifiers by performing operations associated with the transaction. Each mutation generated for a transaction in this manner is written to a cache 428, which contains in-flight (uncommitted) and committed mutations that have not yet been written to the respective mutation logs 424. Once all of the mutations in the cache 428 for a particular transaction have been completed, they may be committed to the data store via a single commit operation. This ensures that any failure to commit a particular mutation to the data store will roll back all of the other mutations for that transaction. Upon a commit of mutations to the data store, each mutation stored in the cache 428 is written to a respective mutation log at step 5. Note that when a mutation is written to a respective mutation log, data values in the mutation log are not overwritten. Instead, a new row may be inserted into the mutation log for each mutation to be written to the mutation log. In some embodiments, once each of the mutations for a transaction have been committed, the transactor host 412 may update the current LSN value for the system.

Once the mutation logs 424 have been updated to include the most recent mutations, a new current LSN snapshot 426 may be generated at step 6. This process is described in greater detail with respect to FIG. 2 above. The new current snapshot 426 may then be used for future read operations.

At step 7, a number of other transactor hosts, when conducting other transactions, may access the cache 428 to determine a current value for one or more data values. For example, the other transactor hosts 430 may, in order to calculate a current value for a particular data value, identify a current value stored in a current LSN snapshot 426 and may then access a cache 428 of the transactor host associated with the data value in order to identify any additional transactions in the cache 428 that pertain to the data value. If such transactions are identified, then the current value for the data value may be calculated by taking the data value from the snapshot and replaying any mutations in the cache 428 for that data value. If no such transactions are identified, then the data value obtained from the snapshot 426 is determined to be the current data value.

In some embodiments, transactions processed via a commit queue 422 may each be handled by a different thread, which enables the transactions to be completed concurrently. However, in embodiments, a transaction which is committed prior to a previous transaction that has precedent over it in the commit queue would not be made visible until after the previous transaction has been committed. One risk of making such transactions visible is that a corrupt snapshot may be created if the system reads from a transaction which has been committed prior to a previous transaction that has precedent over it in the commit queue. An illustrative example of a concurrent commit process that alleviates this risk is described in greater detail with respect to FIG. 5 below.

Figure 5:
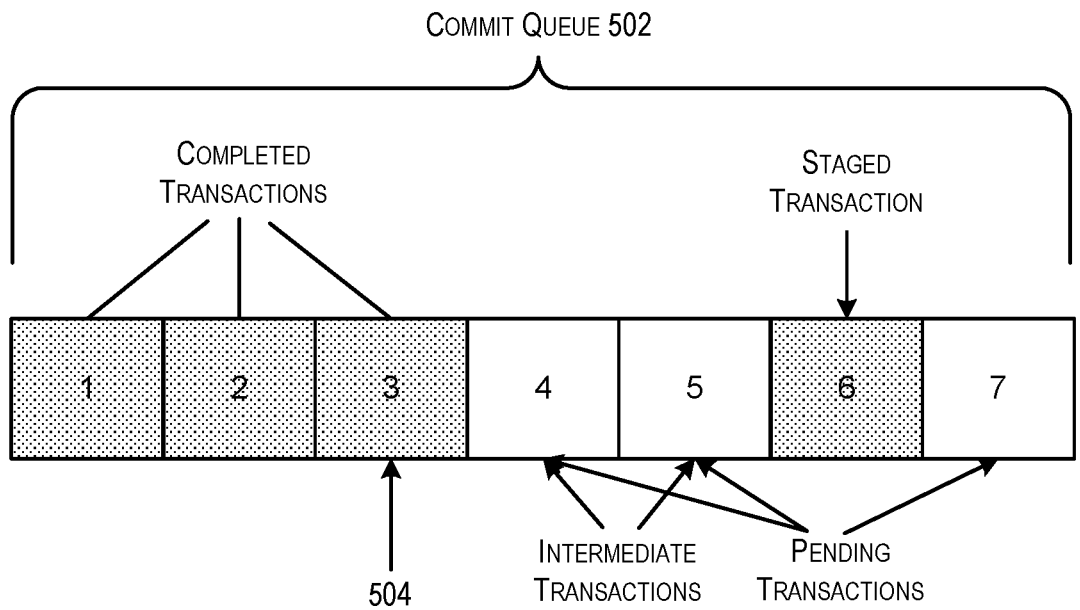
FIG. 5 depicts an illustrative example of a concurrent commit process that may be performed in accordance with at least some embodiments.
Figure 5:
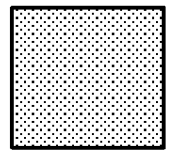
Figure 5:

FIG. 5 depicts an illustrative example of a concurrent commit process that may be performed in accordance with at least some embodiments. In FIG. 5, a commit queue 502, which may be an example of commit queue 422 described in relation to FIG. 4, includes a sequence of transactions at various stages of completion.

In particular, the depicted commit queue 502 includes completed transactions, pending transactions, staged transactions, and intermediate transactions. A completed transaction is a transaction which has been committed to the data store (e.g., written to a cache to be inserted into a mutation log) which is not blocked by any intermediate transactions (e.g., transactions 1-3). A staged transaction is a transaction which has been committed to the data store which is blocked by at least one intermediate transaction (e.g., transaction 6). A pending transaction is a transaction that has not yet been committed to the data store (e.g., transactions 4, 5, and 7). An intermediate transaction is a pending transaction which is blocking (has precedent in the commit queue over) at least one staged transaction (e.g., transactions 4 and 5).

When determining a current state of the data store from a cache memory of a transactor host using the depicted example, the system may be able to view any committed transactions. In other words, the system may be unable to detect intermediate transactions, which would prevent the system from recognizing that some of the committed transactions are staged transactions which should not be included in a snapshot. A snapshot which is generated for an LSN associated with a staged transaction may be corrupt, in that it does not include correct values resulting from intermediate transactions. By way of illustration, consider a scenario in which the system performs a read of a transactor host's cache memory into which the transactions of the commit queue 502 have been written. In this scenario, the system will see committed transactions 1, 2, 3, and 6. Since transaction 6 is latest in the commit queue, it will have the highest LSN value. The system, unable to ascertain that transactions 4 and 5 are outstanding, would then generate a snapshot to be associated with the LSN of transaction 6. Such a snapshot would be inaccurate as the data values impacted by transactions 4 and 5 (which have lower LSN values) are stale.

In embodiments, an index value may be maintained (e.g., by the transactor host) that stores an index value that is indicative of the latest completed transaction 504 from the current commit queue 502. In these embodiments, operations cannot be performed on transactions in the cache of the transactor host having a transaction identifier (e.g., LSN) higher than that index value. For example, data values associated with staged transactions are not read during a read operation.

In embodiments, each time that a transaction is committed, the transactor host determines whether the index value should be updated. To make this determination, the transactor host determines whether any intermediate transactions for the committed transaction have been completed. In some embodiments, this may involve performing a query on a data store to determine whether the intermediate transaction is still uncommitted or whether it has actually been committed to that data store. For example, in some situations, a response from a data store indicating that a particular transaction has been committed may not be received by the transactor host (e.g., the thread performing the transaction crashes or times out). Failing to receive a response, resulting in an "ambiguous outcome," for a transaction may result in the transaction being considered an intermediate transaction even if that transaction was actually committed. When an ambiguous outcome occurs, the transactor host does not know whether the commit happened in the database, did not happen in the database, or will happen in the database in the future. In situations in which the transactor host submits transactions to a data store to be committed in batches, many ambiguous outcomes may occur at once. Upon determining that an intermediary transaction to the newly committed transaction has actually been committed, the index value associated with the latest completed transaction 504 is updated to reference the transaction identifier for the latest committed transaction not having an intermediary transaction. Otherwise, the index value remains the same.

In some embodiments, when performing an operation related to transactions in a cache memory of a transactor host, the entity performing the operation is provided with the index value. That entity may be configured to ignore any transactions which have a transaction identifier that is higher than the index value. In some embodiments, when performing an operation related to transactions in a cache memory of a transactor host, the entity may query the transactor host and the transactor host may return only those transactions for which a transaction identifier is less than or equal to the index value.

Figure 6:
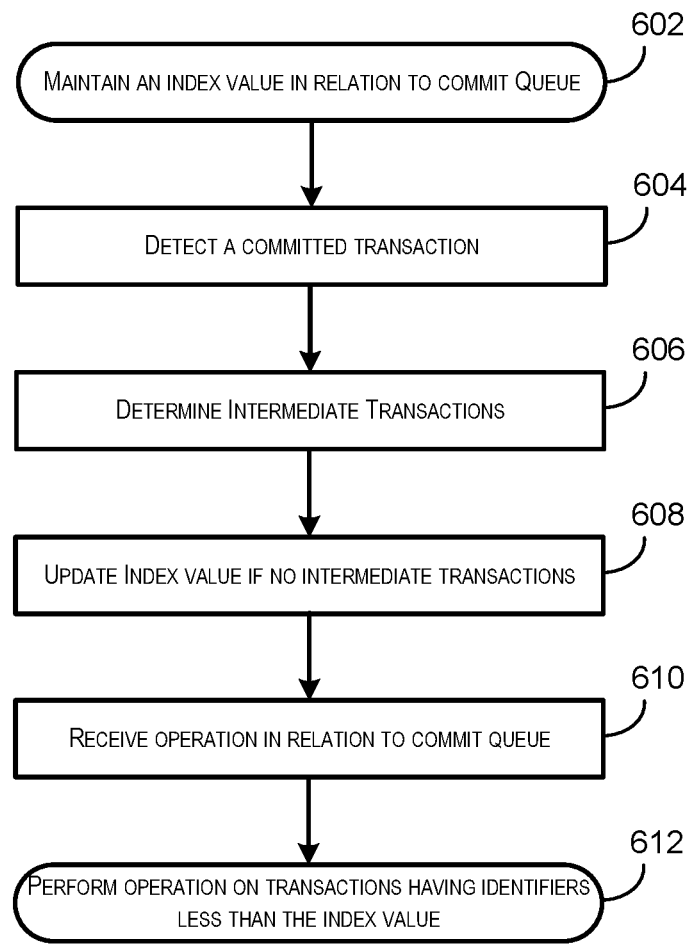
FIG. 6 depicts a flow diagram illustrating an example process for enabling concurrent commits of transaction data in accordance with embodiments.

FIG. 6 depicts a flow diagram illustrating an example process for enabling concurrent commits of transaction data in accordance with embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by one or more elements of the cloud platform 110 shown in FIG. 1. For example, the process 600 may be performed by a transactor host 112 as described with respect to FIG. 1. The code may be stored on a computer-readable storage medium, for example, in the form of a computer program including a plurality of instructions executable by one or more processors. The computer-readable storage medium may be non-transitory.

Process 600 begins at 602 when an index value is maintained by a transactor host in relation to transactions in a commit queue. A the commit queue may be an ordered sequence of transactions. In some embodiments, the transactions in the ordered sequence of transactions may be ordered based on an order in which the transactions were received. Each transaction in the commit queue may be associated with an identifier value (e.g., an LSN), which may be associated with each transaction as it is added to the commit queue. The index value may be set to an identifier value for a current "latest-completed" transaction. A latest-completed transaction may be the completed transaction of the transactions in the commit queue having the highest identifier value. Note that a completed transaction is a committed transaction for which there is no intermediate transaction in the commit queue. There is an intermediate transaction in the commit queue for a committed transaction if there is an uncommitted transaction in the commit queue that has an identifier value which is lower than the identifier value for the committed transaction.

At 604, the process 600 may involve detecting that a first transaction of the transactions in the commit queue has been committed. In some embodiments, the process may further involve conducting the first transaction, which may include identifying one or more data values associated with the first transaction, generating one or more mutations of the one or more data values, and submitting the one or more mutations to a data store to be committed. The transactor host may then detect that the first transaction has been committed upon receiving a response from the data store. In some embodiments, the data store may be a mutation log that includes at least a first column having a logical sequence number and a second column having a payload. In some embodiments, transactions in the commit queue are committed in parallel (e.g., concurrently). In some embodiments, multiple transactions in the commit queue may be committed in a single batch (e.g., sent to a data store via a single batch).

At 606, the process 600 may involve determining whether at least one second transaction of the transactions in the commit queue is an intermediary transaction to the first transaction. A transaction in the commit queue may be an intermediary transaction to the first transaction if it is uncommitted and has a lower identifier value than the first transaction.

At 608, the process 600 may involve, upon determining that no second transaction of the transactions in the commit queue is an intermediary transaction to the first transaction, updating the index value to an identifier for a new latest-completed transaction.

At 610, the process 600 may involve receiving an operation to be performed in relation to the transactions in the commit queue. In some embodiments, the operation to be performed may be a read operation. Each transaction in the commit queue may be associated with one or more data values to be mutated.

At 612, the process 600 may involve performing the operation on the transactions in the commit queue having an identifier value less than or equal to the index value. Performing the operation on the transactions in the commit queue having an identifier value less than or equal to the index value may involve identifying a set of data values associated with the transactions in the commit queue having an identifier value less than or equal to the index value, and determining current data values for the set of data values. In some embodiments, the current data values are determined based on a number of mutations associated with the transactions in the commit queue having an identifier value less than or equal to the index value. In some embodiments, a data store snapshot may be generated based on the operation having been performed on the transactions in the commit queue.

Figure 7:
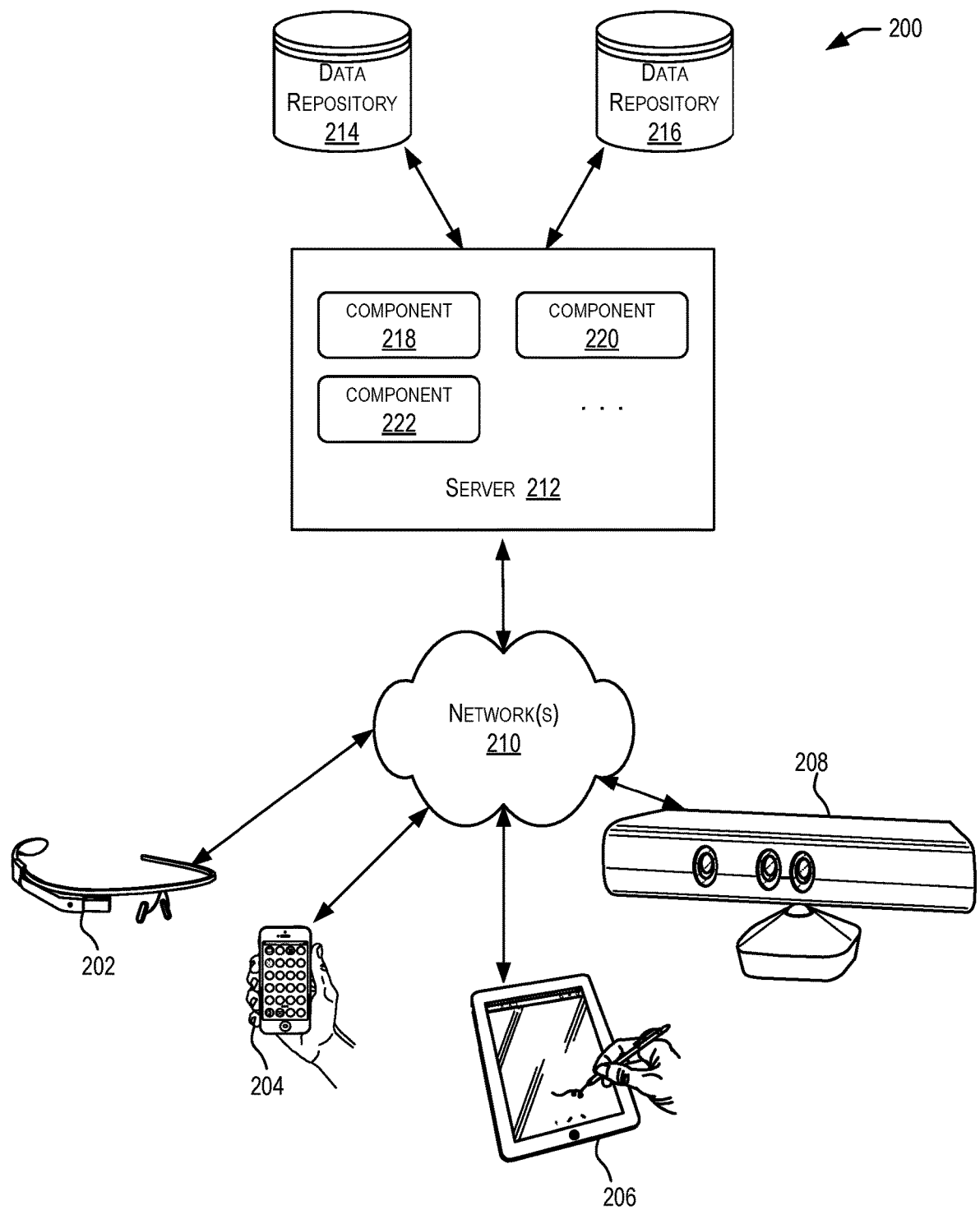
FIG. 7 depicts a simplified diagram of a distributed system for implementing an embodiment.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable the processing described in this disclosure.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to interact with server 712 in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infrared network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of the data repositories 714, 716 may be used to store data or information generated by the processing described herein and/or data or information used for the processing described herein. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
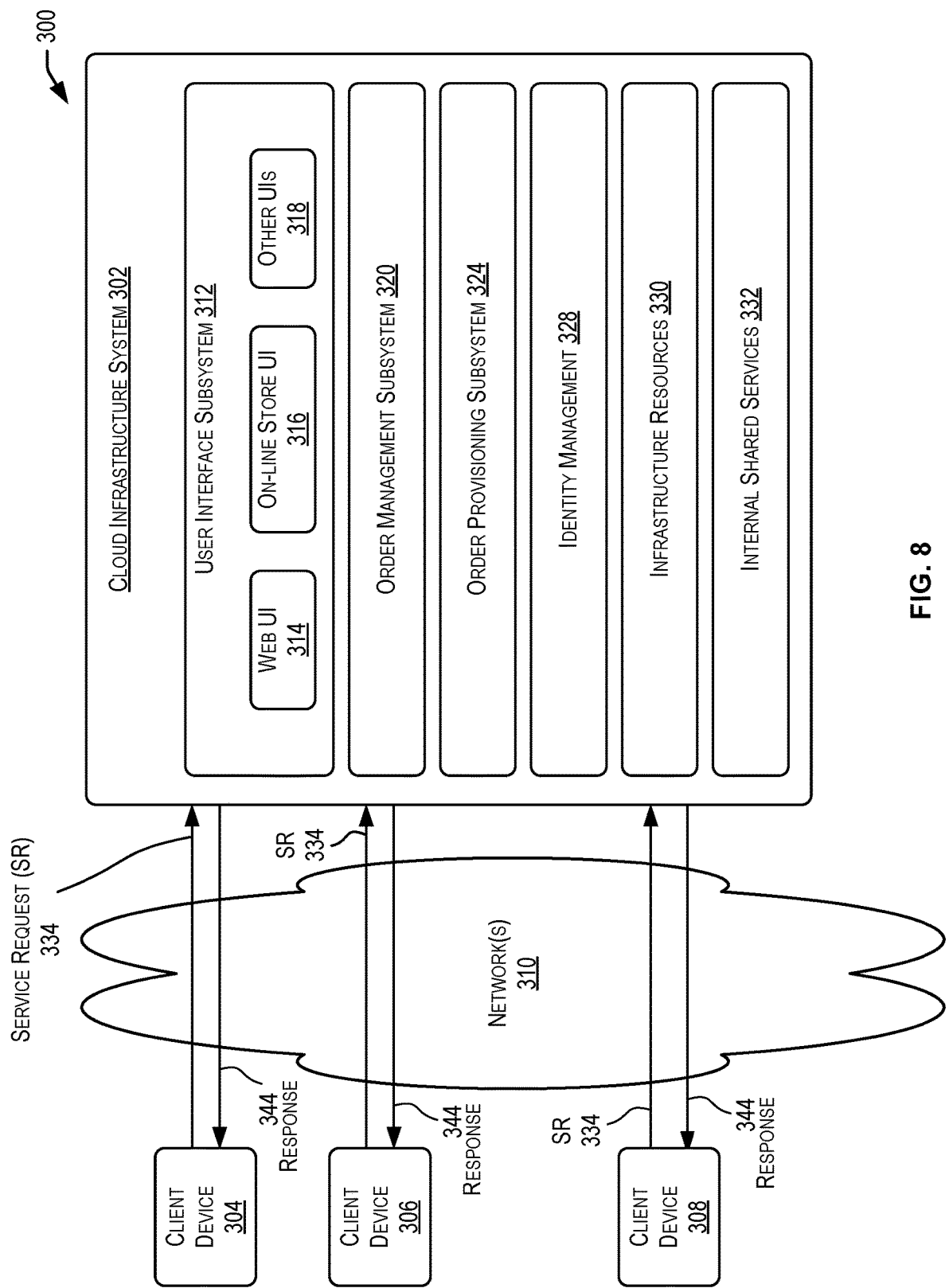
FIG. 8 is a simplified block diagram of a cloud-based system environment offering cloud services, in accordance with certain embodiments.

In certain embodiments, the functionalities described in this disclosure may be offered as services via a cloud environment. FIG. 8 is a simplified block diagram of a cloud-based system environment in which functionalities described herein may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request chatbot-related services described in this disclosure.

In some embodiments, the processing performed by cloud infrastructure system 802 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to.

The service request may include information identifying the customer and one or more services that the customer desires to subscribe to.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
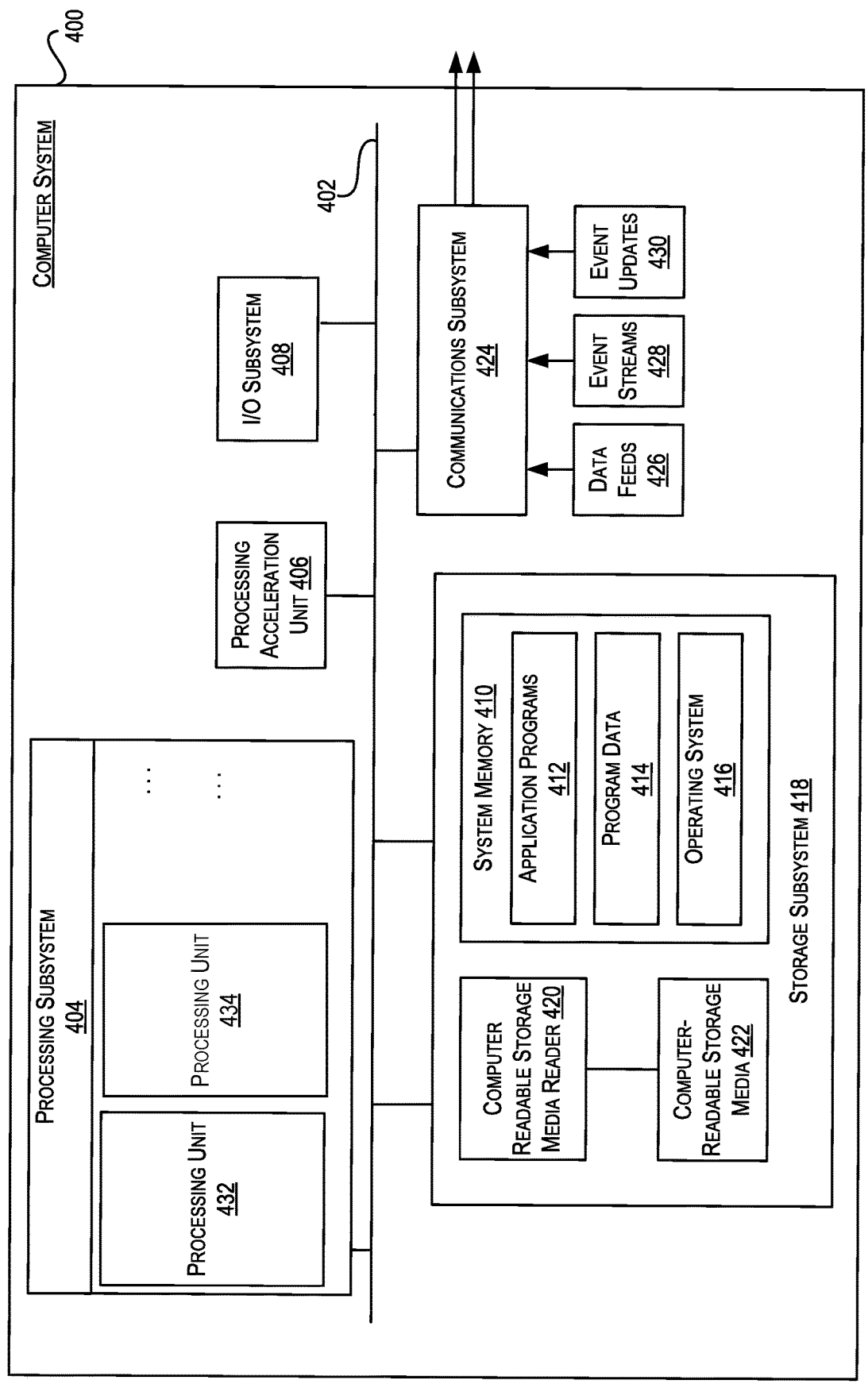
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement any of various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass R blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments provides an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    receiving, by a transactor host, a plurality of transactions from one or more client applications, each of the plurality of transactions having an identifier value of a plurality of identifier values;
    conducting a conflict check by determining, by the transactor host, whether a first identifier value of the plurality of identifier values that corresponds to a first transaction of the plurality of transactions matches a second identifier value of the plurality of identifier values that corresponds to an already committed transaction, the already committed transaction stored in a commit queue; and
    in accordance with no match being determined:
        maintaining, in relation to transactions in the commit queue, an index value associated with a current latest-completed transaction, at least two of the transactions in the commit queue being committed in parallel;
        storing, by the transactor host, mutations of at least a subset of the transactions in a cache memory, the cache memory configured to store the mutations prior to at least one of being written to a mutation log or being included in a data store snapshot;
        detecting, by the transactor host, that a first transaction of the transactions in the commit queue has been committed;
        determining, by the transactor host, whether at least one second transaction of the transactions in the commit queue is an intermediary transaction to the first transaction;
        upon determining that no second transaction of the transactions in the commit queue is an intermediary transaction to the first transaction, updating the index value to an identifier for a new latest-completed transaction;
        receiving, by the transactor host, an operation to be performed in relation to the transactions in the commit queue; and
        performing, by the transactor host, the operation on the transactions in the commit queue having an identifier value less than or equal to the index value.

2. The method of claim 1, wherein the commit queue comprises an ordered sequence of transactions.

3. The method of claim 2, wherein transactions in the ordered sequence of transactions are ordered based on an order in which the transactions were received.

4. The method of claim 1, wherein the intermediary transaction to the first transaction comprises an uncommitted transaction in the commit queue that has a lower identifier value than the first transaction.

5. The method of claim 1, wherein the new latest-completed transaction comprises a completed transaction of the transactions in the commit queue having the highest identifier value.

6. The method of claim 5, wherein a completed transaction is a committed transaction for which no uncommitted transaction in the commit queue has a lower identifier value.

7. The method of claim 1, wherein the operation to be performed is a read operation.

8. The method of claim 1, wherein each transaction in the commit queue is associated with one or more data values to be mutated.

9. A computing device comprising:
a processor; and
a memory including instructions that, when executed with the processor, cause the computing device to, at least:
receive a plurality of transactions from one or more client applications, each of the plurality of transactions having an identifier value of a plurality of identifier values;
conduct a conflict check by determining whether a first identifier value of the plurality of identifier values that corresponds to a first transaction of the plurality of transactions matches a second identifier value of the plurality of identifier values that corresponds to an already committed transaction, the already committed transaction stored in a commit queue; and
in accordance with no match being determined:
maintain, in relation to transactions in the commit queue, an index value associated with a current latest-completed transaction, at least two of the transactions in the commit queue being committed in parallel;
store mutations of at least a subset of the transactions in a cache memory, the cache memory configured to store the mutations prior to at least one of being written to a mutation log or being included in a data store snapshot;
detect that a first transaction of the transactions in the commit queue has been committed;
determine whether at least one second transaction of the transactions in the commit queue is an intermediary transaction to the first transaction;
upon determining that no second transaction of the transactions in the commit queue is an intermediary transaction to the first transaction, update the index value to an identifier for a new latest-completed transaction;
receive an operation to be performed in relation to the transactions in the commit queue; and
perform the operation on the transactions in the commit queue having an identifier value less than or equal to the index value.

10. The computing device of claim 9, wherein the instructions further cause the computing device to conduct the first transaction.

11. The computing device of claim 10, wherein conducting the first transaction comprises:
identifying one or more data values associated with the first transaction;
generating one or more mutations of the one or more data values; and
submitting the one or more mutations to a data store to be committed.

12. The computing device of claim 11, wherein the data store is a mutation log.

13. The computing device of claim 12, wherein the mutation log comprises at least a first column having a logical sequence number and a second column having a payload.

14. The computing device of claim 13, wherein performing the operation on the transactions in the commit queue having an identifier value less than or equal to the index value comprises:
identifying a set of data values associated with the transactions in the commit queue having an identifier value less than or equal to the index value; and
determining current data values for the set of data values.

15. The computing device of claim 14, wherein the current data values are determined based on a number of mutations associated with the transactions in the commit queue having an identifier value less than or equal to the index value.

16. A non-transitory computer readable medium storing specific computer-executable instructions that, when executed by a processor, cause a computer system to at least:
receive a plurality of transactions from one or more client applications, each of the plurality of transactions having an identifier value of a plurality of identifier values;
conduct a conflict check by determining whether a first identifier value of the plurality of identifier values that corresponds to a first transaction of the plurality of transactions matches a second identifier value of the plurality of identifier values that corresponds to an already committed transaction, the already committed transaction stored in a commit queue; and
in accordance with no match being determined:
maintain, in relation to transactions in the commit queue, an index value associated with a current latest-completed transaction, at least two of the transactions in the commit queue being committed in parallel;
store mutations of at least a subset of the transactions in a cache memory, the cache memory configured to store the mutations prior to at least one of being written to a mutation log or being included in a data store snapshot;
detect that a first transaction of the transactions in the commit queue has been committed;
determine whether at least one second transaction of the transactions in the commit queue is an intermediary transaction to the first transaction;
upon determining that no second transaction of the transactions in the commit queue is an intermediary transaction to the first transaction, update the index value to an identifier for a new latest-completed transaction;
receive an operation to be performed in relation to the transactions in the commit queue; and
perform the operation on the transactions in the commit queue having an identifier value less than or equal to the index value.

17. The non-transitory computer readable medium of claim 16, wherein multiple transactions in the commit queue are committed in a single batch.

18. The non-transitory computer readable medium of claim 16, wherein a data store snapshot is generated based on the operation having been performed on the transactions in the commit queue.

19. The non-transitory computer readable medium of claim 16, wherein an identifier value is associated with each transaction as it is added to the commit queue, and wherein the identifier value is a logical sequence number.

\* \* \* \* \*